United States Patent [19]
Miura et al.

[11] Patent Number: 5,359,580
[45] Date of Patent: Oct. 25, 1994

[54] METHOD OF USING A SINGLE MICROPROCESSOR TO PERFORM DATA RETRIEVAL AND DISC REPRODUCTION CONTROL IN A DISC REPRODUCING APPARATUS

[75] Inventors: Yoshihiro Miura, Tokyo; Koji Takagi; Takashi Morita, both of Kanagawa; Fumihiko Yoshii, Tokyo, all of Japan

[73] Assignee: Sony Corporation, Tokyo, Japan

[21] Appl. No.: 20,179

[22] Filed: Feb. 22, 1993

Related U.S. Application Data

[63] Continuation of Ser. No. 626,216, Dec. 12, 1990, abandoned.

[30] Foreign Application Priority Data

Jan. 9, 1990 [JP] Japan .................................. 2-2149

[51] Int. Cl.$^5$ .............................................. G11B 7/00
[52] U.S. Cl. .......................................... 369/32; 369/33; 369/47
[58] Field of Search ................. 369/32, 47, 48, 49, 369/50, 43, 33, 54, 44.11; 358/342; 360/73.03, 78.04

[56] References Cited

U.S. PATENT DOCUMENTS

| | | | |
|---|---|---|---|
| 4,575,835 | 3/1986 | Nishikawa et al. | 369/50 |
| 4,817,068 | 3/1989 | Yamauchi | 369/30 |
| 4,817,075 | 3/1989 | Kikuchi et al. | 369/47 |
| 4,829,498 | 5/1989 | Aoyagi et al. | 369/45 |
| 4,882,671 | 11/1989 | Graham et al. | 360/75 |
| 4,882,719 | 11/1989 | Kimura et al. | 369/32 |
| 4,926,405 | 5/1990 | Hangai et al. | 369/32 |
| 4,942,563 | 7/1990 | Yamamuro | 369/44.11 |
| 4,949,323 | 8/1990 | Yoshida | 369/32 |
| 4,962,494 | 10/1990 | Kimura | 369/48 |
| 5,109,365 | 4/1992 | Watanabe et al. | 369/32 |

FOREIGN PATENT DOCUMENTS

| | | |
|---|---|---|
| 0149101A1 | 12/1984 | European Pat. Off. . |
| 0252646A1 | 6/1987 | European Pat. Off. . |
| 61-0085268 | 4/1986 | Japan . |
| 62-0107356 | 4/1987 | Japan . |

Primary Examiner—Robert J. Pascal
Assistant Examiner—Tan Dinh
Attorney, Agent, or Firm—Ian Hardcastle

[57] ABSTRACT

A reproducing apparatus for a disc in which data read out from a disc are retrieved, in which, with the use of sole CPU, a data retrieval related processing is executed as a main routine and a reproduction control processing for the disc is executed as a subroutine by timer interrupt to achieve reduction in the number of the CPUs.

4 Claims, 4 Drawing Sheets

METHOD OF USING A SINGLE MICROPROCESSOR TO PERFORM DATA RETRIEVAL AND DISC REPRODUCTION CONTROL IN A DISC REPRODUCING APPARATUS

This is a continuation of co-pending application Ser. No. 07/626,216 filed on Dec. 12, 1990 and now abandoned.

FIELD OF THE INVENTION

This invention relates to a reproducing apparatus for a disc in which data such as letter data, or character data, or image data read out from the disc is displayed on a display section. More particularly, it relates to a reproducing apparatus in which a single CPU performs data retrieval and controls the reproduction of data from the disc.

DESCRIPTION OF THE RELATED ART

"A signal processing system . . . by a bus line." with "A disc reproducing apparatus for reproducing discs on which letter or character data is stored and which performs data retrieval, in which the data to be reproduced from the disc is selected, employs a signal processing system. Conventionally, the signal processing system uses two or more CPUs, including a host CPU and a drive CPU, interconnected by a bus line.

In a signal processing system using two or more CPUs, jobs such as operating key input processing, display processing, data retrieval and bus line control are performed by a host CPU. Jobs such as servo control of the optical head, servo control of the optical head feed system servo control of the disc rotating-driving means, processing signals from the optical head, data correction, and bus control, are by a drive CPU. Among the jobs executed by the drive CPU, the above mentioned servo control and signal processing fuctions are executed by a separate CPU which is connected to the drive CPU by a bus line.

If the signal processing system for the disc reproducing apparatus includes plural CPUs, the area occupied by the CPUs in the reproducing apparatus makes it impossible to reduce the size of the reproducing apparatus.

In addition, it is difficult to design the bus line interconnecting plural CPUs, while the cost of the apparatus is increased through the use of plural CPUs.

OBJECT AND SUMMARY OF THE INVENTION

It is therefore an object of the present invention to provide a method of controlling a disc reproducing apparatus in which the above-mentioned problems of the conventional methods of controlling a disc reproducing apparatus are overcome, and to provide a method that enables all the signal processing operations of the disc reproducing apparatus to be carried out by a single CPU.

Accordingly, the present invention provides a method of using a single central processing unit to perform data retrieval and to control the disc reproduction mechanism in a disc reproducing apparatus that reproduces selected data from a disc. In the method, there are provided a disc reproduction mechanism, and a single central processing unit operating in response to a program including a main routine and a subroutine. The main routine is executed to cause the single central processing unit to perform data retrieval, in which the data to be reproduced from the disc is selected. The subroutine is executed in response to a timed interrupt provided to the single central processing unit. The subroutine causes the single central processing unit to control the disc reproduction mechanism to reproduce the data from the disc.

DETAILED DESCRIPTION OF PREFERRED EMBODIMENTS

Figure 1:
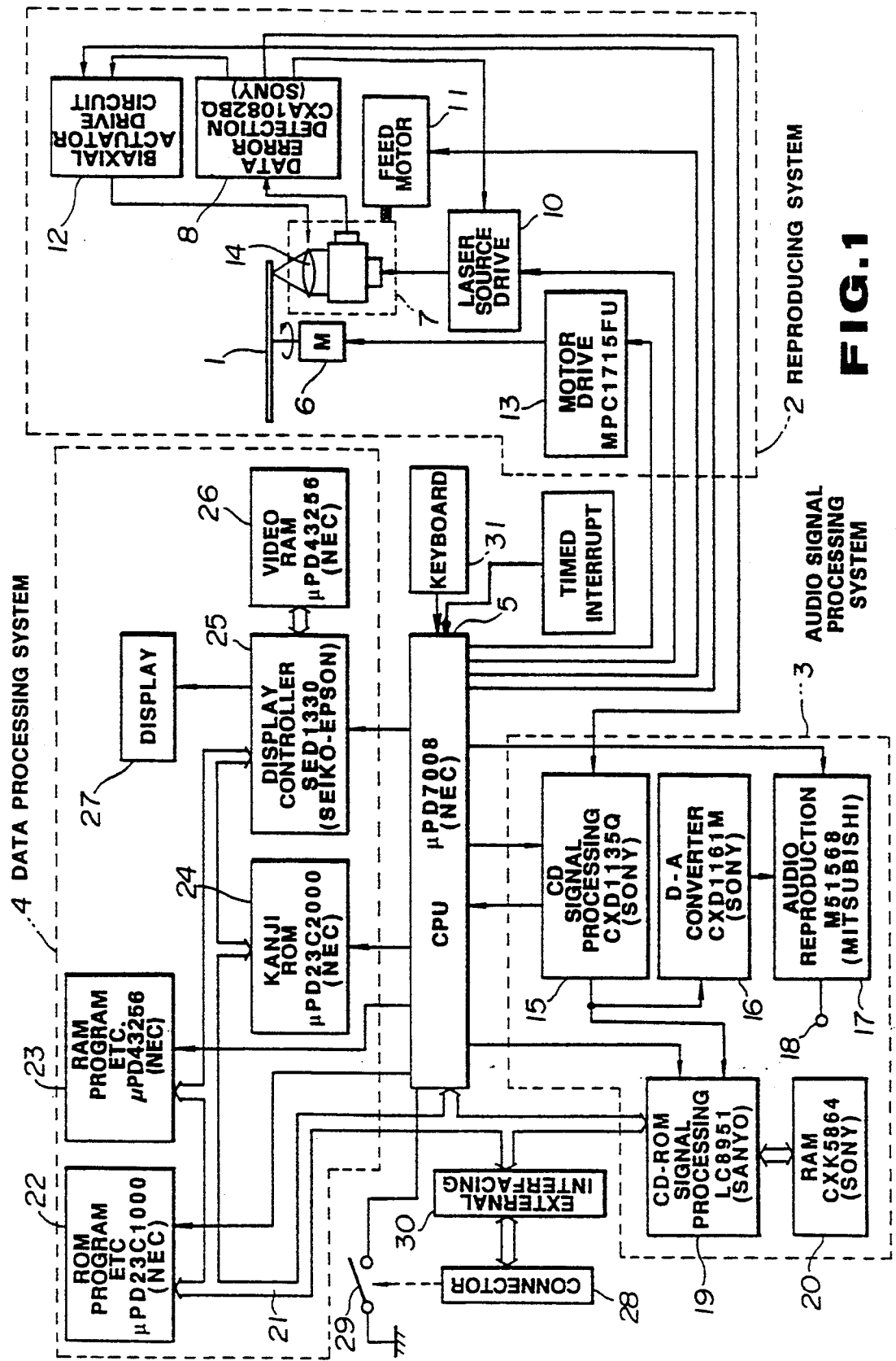
FIG. 1 is a block diagram showing a signal processing system of a disc reproducing apparatus according to the present invention.

By referring to the drawings, a preferred illustrative embodiment of the present invention will be explained in detail.

The following embodiment is concerned with a portable disc reproducing apparatus in which data such as characters or letters recorded on an optical disc are read out and displayed on a display section to provide the apparatus with the function of a so-called electronic dictionary.

Referring to FIG. 1, the signal processing system of the disc reproducing apparatus according to the present invention comprises a reproducing system 2 for reproducing data recorded on the optical disc 1, an audio signal processing system 3 for audio signal processing of the reproduced data, and a data processing system 4 for performing data retrieval or the reproduced data for display. The systems 2 to 4 are controlled by a central processing unit, (CPU) 5 which will be described below. As CPU 5, a CPU manufactured by NEC Corporation with the part number $\mu$PD 7008 is preferably employed.

In the reproducing system 5, the CPU 5, in response to an input signal from the keyboard 31 controls a laser light, source driving circuit 10, a feed motor (linear feed motor) 11, a biaxial actuator driving circuit 12, and a motor driving circuit 13. As the motor driving circuit 13, a device manufactured by Motorola Inc. with the part number MPC1715FU is preferably employed. The CPU 5 controls the motor driving circuit 13 for driving a spindle motor 6 at, for example, a constant linear velocity (CLV) or at a constant angular velocity (CAV), while simultaneously controlling the feed motor 11. The feed motor 11 moves the optical pickup which comprised an objective lens 14 including a biaxial device, a light source, a photodetector, and a cylindrical lens or the like, for roughly shifting the light spot of a laser beam to a predetermined track on the optical disc 1. The CPU also controls the biaxial actuator driving circuit 12 for shifting the objective lens 14 of the pickup 7 both in the direction along the optical axis of lens for focusing control and in the direction normal to the optical axis to shift the beam spot into register with the predetermined track on the optical disc 1 for tracking control for reproducing the data recorded on the optical disc 1.

In the signal recording region of the optical disc 1, there are provided a sub-code area and a data area for each frame. Sync signals, position data and timing data are recorded in the sub-code area, while data such as character or letter data are recorded in the data area. The data signals read out from the optical disc 1 are supplied to an error detection-data detection circuit 8. The error detection-data detection circuit generates the sum or product to provide a laser output error signal, a focusing error signal and a tracking error signal. As the error detection-data detection circuit 8, a device manufactured by Sony Corporation with the part number CXA1082BQ is preferably employed. The laser output error signal is supplied to the laser light source driving circuit 10, while the focusing error signal and the tracking error signal are supplied to the biaxial actuator driving circuit 12. The laser light source driving circuit 10 controls the power of the laser light irradiating on the surface of the optical disc 1 to a constant value in response is the laser output error signal supplied thereto. The biaxial actuator driving circuit 12 is responsive to the focusing error signal and the tracking error signal to shift the objective lens 14 to maintain the focusing and tracking in a normal condition to provide for accurate data readout.

The signals reproduced from the optical disc 1 along with detected sync signals, timing data or the like, are supplied to a CD signal processing circuit 15 of the signal processing system 3 by way of the error detection-data detection circuit 8. As the CD signal processing circuit 15, a device manufactured by Sony Corporation with the part number CXD1135Q is preferably employed. To this CD signal processing circuit 15, there are supplied from CPU 5 detection signals indicating the type of optical disc loaded in the disc reproducing apparatus, that is, whether the disc is an optical disc for audio on which audio data is recorded or a CD-ROM, that is, an optical disc on which the character information of, for example, a dictionary or an encyclopedia, is recorded in the form of character data. The CD signal processing circuit 15 separates the detection signals supplied thereto into sub-data signals such as sync signals or timing information and main data signals and, if the main data signals are audio data, transmits the audio data to a digital/analog (D/A) converter 16. As the D/A converter 16, a device manufactured by Sony Corporation with the part number CXD1161M, is preferably employed. The audio data signal, supplied to the D/A converter 16, is thereby converted into analog signals, which are then supplied to an audio reproducing circuit 17 so as to be outputted as audio signals at an output terminal 18. As the audio reproducing circuit 17, a device manufactured by Mitsubishi Electric Corporation with the part number M51568 is preferably employed. If the data signals supplied to the CD signal processing circuit 15 are the above mentioned character data signals, the CD signal processing circuit 15 transmits the character data signals or the like to a CD-ROM signal processing circuit 19. As the CD-ROM signal processing circuit 19, a device manufactured by Sanyo Electric Co., Ltd. with the part number LC8951 is preferably employed. The character data signals or the like, supplied to the CD-ROM signal processing circuit 19, are reproduced with the random access memory (RAM) 20 functioning as a transient, storage means, in response to signals supplied thereto from CPU 5. As the RAM 20, a device manufactured by Sony Corporation with the part number CXK5864 is preferably employed. The ROM 22 and the RAM 23, in which programs or the like are recorded, are connected to the data bus 21. As the ROM 22 and RAM 23, devices manufactured by NEC Corporation with part numbers µPD23C1000 and µPD43256, are preferably employed, respectively. The reproduced character data signals or the like are transmitted over data bus 21. A display image is stored in the video RAM 26 in accordance with Kanji Patterns read out from a Kanji ROM 24 in response to the character data signals. The display image in the video RAM 26 is read out by the display controller 25 in response to signals from CPU 5 and are displayed on the display section 27, such as a liquid crystal display (LCD). As the Kanji ROM 24 and the display controller 25, the devices manufactured by NEC Corporation with part numbers µPD23C2000 and µPD43256 are preferably employed, respectively.

It will be noted that, when an external interface is connected to the connector 28, the switch 29 is turned on to reset the CPU 5. Signal processing is then performed under the instructions supplied from interface. These instructions are processed by the external interface processing circuit 30 and the thus processed data are displayed on the display section 27 over data bus 21, as described previously.

Figure 3:
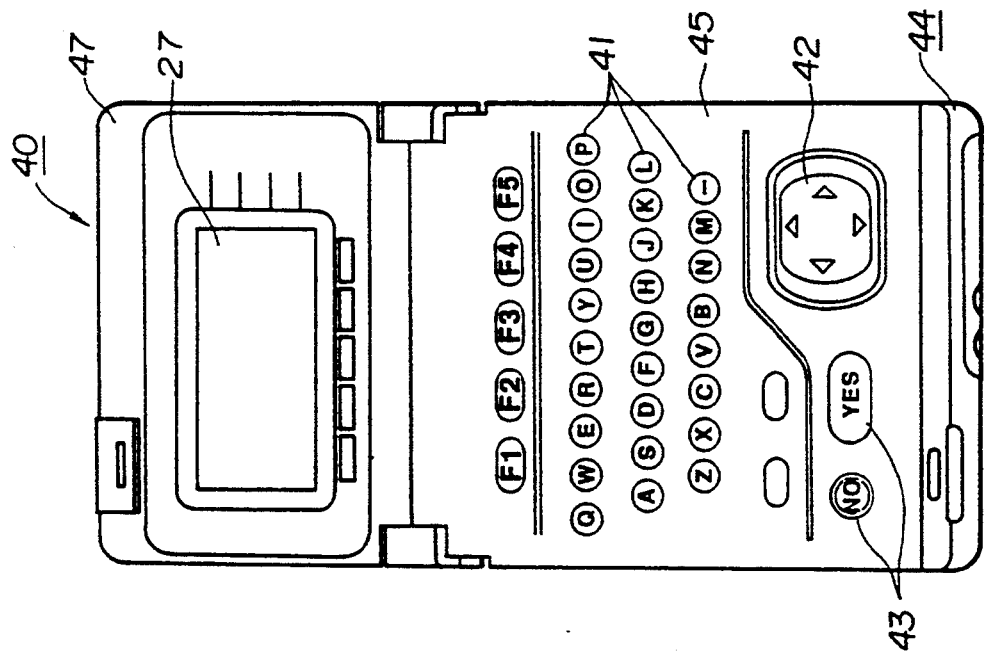
FIG. 3 is a plan view of the disc reproducing apparatus with the cover opened to illustrate the display section and the operating key section.
Figure 2:
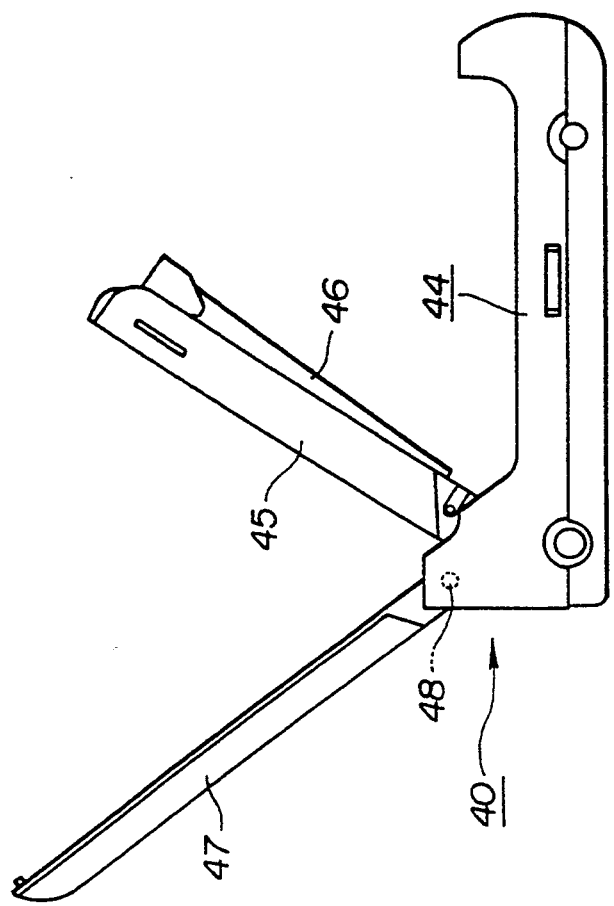
FIG. 2 is a perspective view showing the disc reproducing apparatus with the cover opened and with its cartridge holder rotated to the disc cartridge insertion or removal position.

Referring now to FIG. 1, 2 and 3, the disc reproducing apparatus 40, which has the function of an electronic dictionary and which is provided with the above described signal processing system, has enclosed in the main body of the apparatus 44 the data processing system 4, the above mentioned data reproducing system 2, the CPU 5 and the audio signal processing system 3, excluding the display section 27, which may for example be an LCD. Within the main body of the apparatus 44 may be loaded a disc cartridge accommodating therein a CD-ROM on which is recorded data such as data representing the characters of a dictionary or an encyclopedia. Referring to FIGS. 2 and 3, the operating key section 45, on which are arrayed various operating keys, such as the alphabetic keys 41, the cursor shift key 42, and the or a selection key 43 for selecting an item to which t, he cursor has been shifted, is rotatably mounted by a pivot shaft on the side of the main body 44 facing the outside when a cover is applied to the main body 44. On the reverse side of the key operating section 45 opposite to the side provided with the keys, there is provided a cartridge holder 46 into and out of which may be introduced or removed a disc cartridge containing a CD-ROM. The cartridge holder 46 is supported by the main body 44 so that the cartridge holder rotates with the rotation of the operating key section 45. The cover 47 for overlying the operating key section 45 to cover the upper side of the main body 44 is rotatably mounted by means of the pivot shaft 48.

On an inner surface of the cover 47, that is the side facing the operating key section 45 when the main body 44 is covered as shown in FIG. 2, is provided the display section 27 for displaying the information, such as the character information, reproduced from the CD-ROM.

The cover 47 fitted with the display section 27 is supported by the main body 44 in such a manner that, during use of the disc reproducing apparatus 40, the cover member 47 may be rotated to and maintained at a desired rotational position in which the surface of the operating key section 45 is exposed and the display screen of the display section 27 may be viewed easily. During non-use of the reproducing apparatus, the cover 47 may be closed over the operating key section 45 into an overall compact rectangular form to facilitate handling or transport.

With the above described disc reproducing apparatus 40, which is provided with the above described signal processing system and adapted to read out and reproduce data recorded on a CD-ROM for display on the display section, the portions of the disc reproducing apparatus which provide the man-machine interface for data processing and display do not need strict processing timing and hence may be processed as a main routine. The remaining operations may be performed by an interrupt routine, so that all of the signal processing may be performed by the single CPU 5. Also in consideration that software control is performed between the drive CPU of the present apparatus and the host CPU of a commercially available microcomputer system provided outside the present apparatus, the code system between the command packet and the status is utilized in the bus line system interconnecting these CPUs. When it is desired to control the present apparatus using an external host, the main routine in the drive CPU aspect of the present system is replaced by HALT commands so that the present system may be used by the host CPU by starting the bus line control routine.

Figure 4:
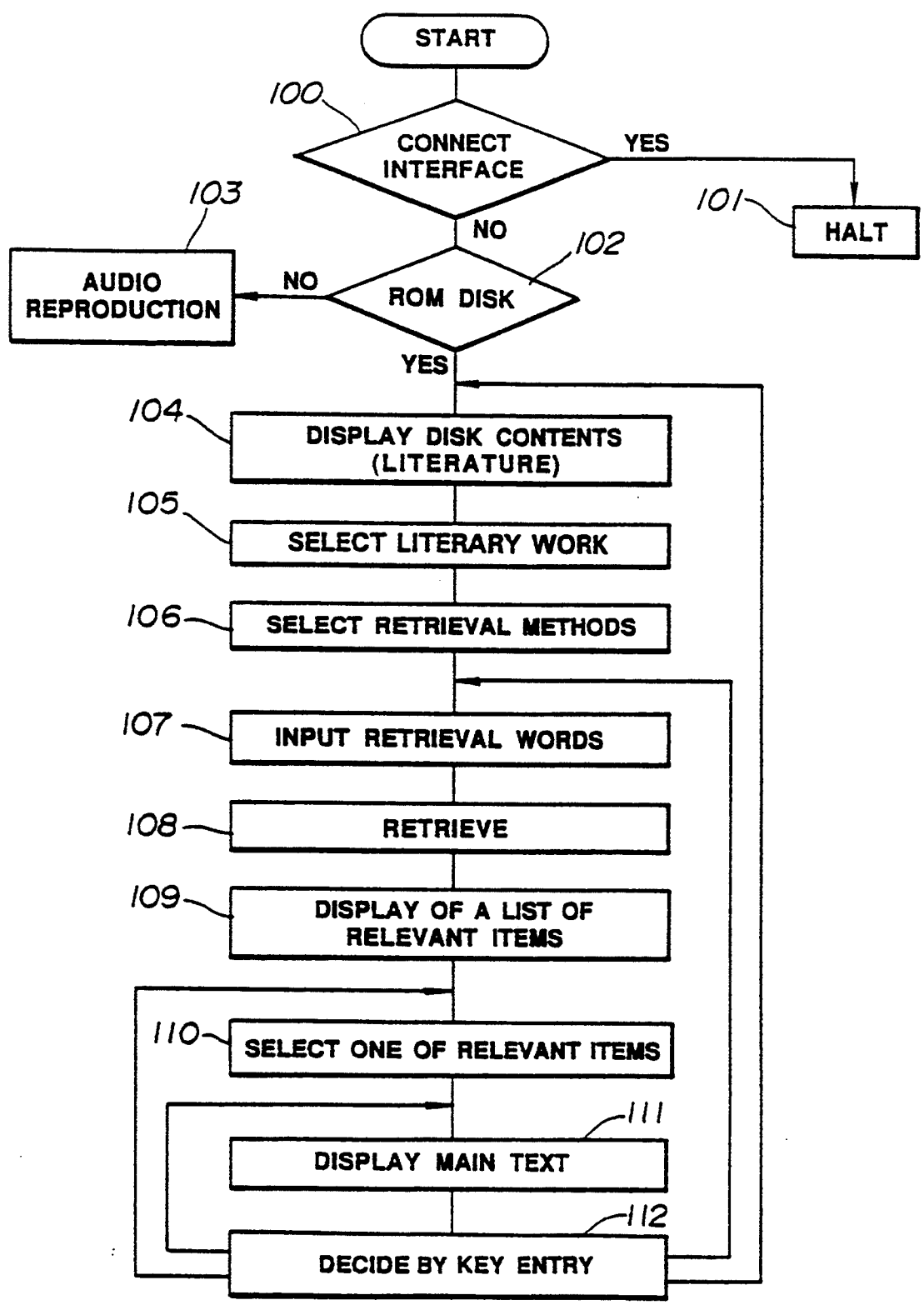
FIG. 4 is a flowchart showing the main routine of a CPU constituting the signal processing system of the disc reproducing apparatus.

The operation of the main routine of the CPU 5 is explained with reference to a flow chart shown in FIG. 4.

First, in step 100, it is determined whether the external interface is connected to the disc reproducing apparatus that is, if the switch 29 is turned on. If the switch 29 is turned on, that is if the external interface is connected the program proceeds to step 101 where the CPU 5 is reset and the so-called HALT operation is performed under the instructions from the interface. If the switch 29 is off, the program proceeds to step 102.

In step 102, it is determined whether the optical disc loaded in the disc reproducing apparatus 40 is the CD-ROM disc, such as dictionary or encyclopedia. If the result is NO, the program proceeds to step 103 where it is determined that the disc is the optical disc for audio and the above mentioned audio signal processing is performed. If the result is YES the program proceeds to step 104.

In step 104, the data signals reproduced from the loaded disc are processed, under the assumption that the data signals reproduced from the loaded disc are from a CD-ROM disc, and a display of the literary works recorded on the disc is made on the display section 27 (display of the contents). The program then proceeds to step 105.

In step 105, a desired one of the displayed literary works selected by shifting the cursor with the aid of the cursor shift key 42 and then using the selection key 43. The program then proceeds to step 106.

In step 106, the method of retrieving the desired one of the displayed literary works is selected. In step 107, a retrieve word designating the selected retrieve method is entered by alphabetic keys work 41 on the keyboard 31. The program then proceeds to step 108.

In step 108, the designated retrieve operation is performed. The program then proceeds to step 109.

In step 109, the above retrieval is performed to display a table of the relevant items on the display section 27. The program then proceeds to step 110.

In step 110, a desired one of the items is selected from the displayed relevant items. The program then proceeds to step 111.

In step 111, the text of the selected item is displayed before the program proceeds to step 112.

In step 112, when it is desired to scroll the displayed text, the program is returned to step 111 to perform text display in accordance with the scroll display, by a corresponding key operation on keyboard 31. When it is desired to view other items, the program is returned to step 110 to select another desired item. When it is desired to select some other word of the same literary work the program is returned to step 107 for entry of the new word. When it is desired to view some other literary the program is returned to step 104 to redisplay the disc contents.

Since the above-mentioned main routine operation is performed by user's key entry, the remaining signal processing operations, such as servo control, signal processing, data error correction, key entry or bus line control, are performed as interrupt subroutines. That is, no matter whether the main routine is in a stand-by state or being executed, an interrupt demand signal requesting an interrupt is supplied to the CPU 5 every 13.3 milliseconds, compulsorily causing the CPU 5 to execute the subroutine.

Figure 5:
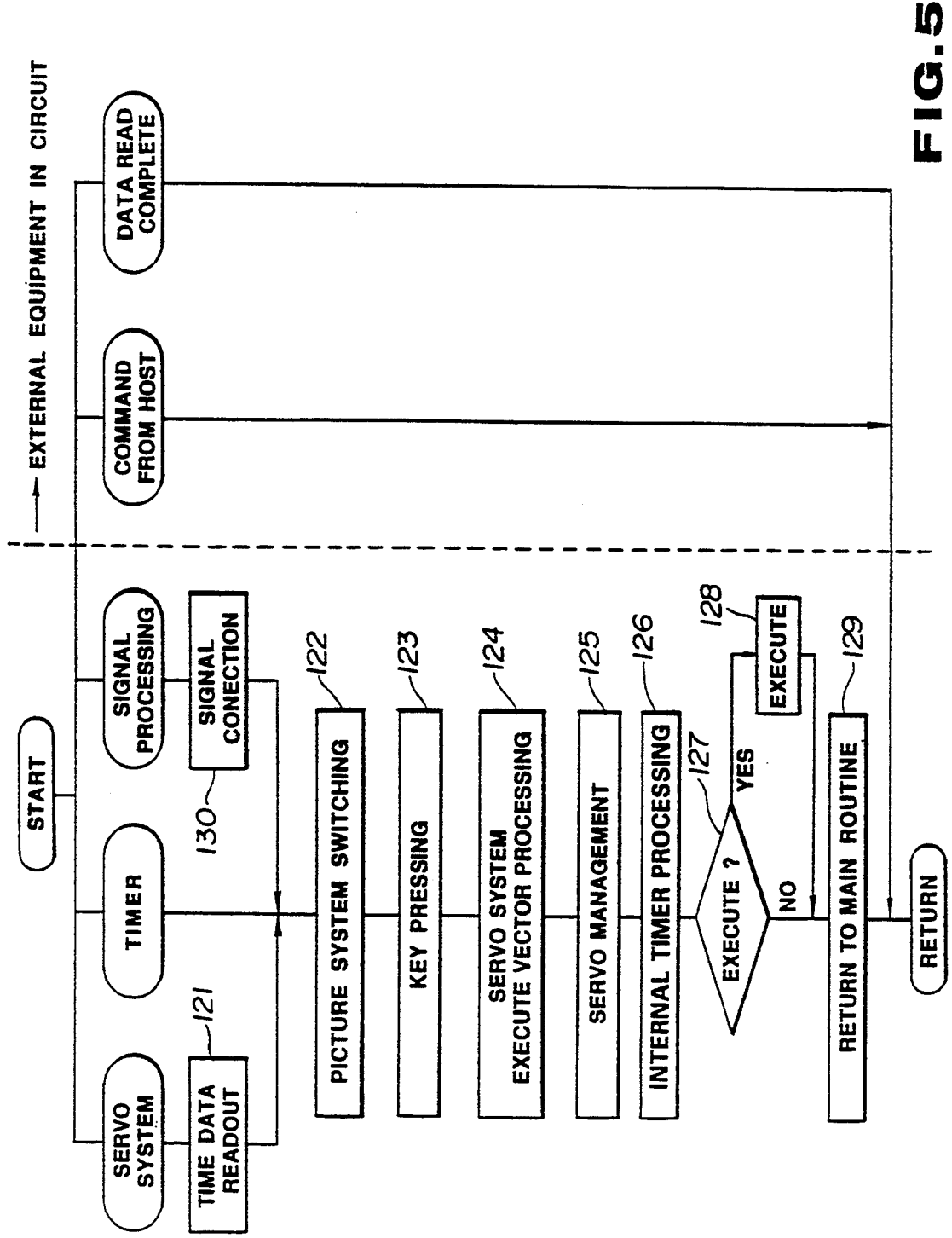
FIG. 5 is the flowchart showing a subroutine of the CPU.

The operation of the interrupt subroutine is explained by referring to a flowchart shown in FIG. 5.

In the interrupt subroutine, time data is read out at step 121 for detecting the position of the optical pickup 7 on the disc. The program then proceeds to step 122.

In step 122, the processing for the optical pickup system is performed, before the program proceeds to step 123.

In step 123, the key-pressing operation is performed, before the program proceeds to step 124.

In step 124, the servo system executing vector operation is performed, before the program proceeds to step 125.

In step 125, servo supervision is performed, before the program proceeds to step 126.

In step 126, internal timer processing is performed, before the program proceeds to step 127.

In step 127, it is determined if an execute operation is to be performed. If the result is YES, the program proceeds to step 128 where the execute operation is performed, after which the program proceeds to step 129. If the result is NO, the program proceeds directly to step 129.

In step 129, the program reverts to the main routine to resume data retrieval processing.

In the case of the time processing operation, the program prosecutes the operation from 122 to step 129. In the case of the signal processing, the processing such as signal correction is performed at step 130. Subsequently, the program prosecutes the operation from step 122 to step 129.

When the external interface is connected, a halt process is performed in the main routine, as mentioned previously. In this case, the operation from steps 121 to 130 is similarly executed responsive to a timed interrupts. Post-processing is also executed following data readout and host commands given from the host by means of the above mentioned interface.

It will be seen from the foregoing that the present invention provides a disc reproducing apparatus in which, with the use of a single CPU, the data retrieval operation is executed by the CPU as a main routine and disc reproduction is controlled by a subroutine in response to a timed interrupt. In this manner, the area set aside for CPU may be reduced as compared to the conventional system employing plural CPUs, while the size of the base plate or the equipment and hence the costs may also be reduced.

In addition, a hybrid code system processing resulting from the use of plural CPUs becomes unnecessary to facilitate software formulation.

What is claimed is:

1. A method of using a single central processing unit to perform data retrieval and to control a disc reproduction mechanism in a disc reproducing apparatus for reproducing selected data from a disc, the method comprising the steps of:
    providing:
        a disc reproduction mechanism, and
        a single central processing unit operating in response to a program including a main routine and a subroutine;
    executing the main routine to cause the single central processing unit to perform data retrieval, wherein data to be reproduced from the disc is selected: and
    executing the subroutine in response to a timed interrupt provided to the single central processing unit, the subroutine causing the single central processing unit to control the disc reproduction mechanism in reproducing data from the disc.

2. The method according to claim 1, wherein, in the step of executing the subroutine, the timed interrupt is provided by an interrupt demand signal repetitively supplied to the single central processing Unit at a predetermined time interval, the interrupt demand signal forcing the single central processing unit to execute the subroutine.

3. The method according to claim 1, wherein:
    the step of providing the disc reproduction mechanism includes the steps of providing:
        an optical reproducing head;
        a feed mechanism for the optical head;
        a disc rotating mechanism;
        operating keys; and
        a bus line interconnecting the single central processing unit with the optical reproducing head, the feed mechanism, the disc rotating mechanism, and the operating keys; and
    in the step of executing the subroutine, the subroutine causes the single central processing unit to control the disc reproducing mechanism by performing:
        servo control of the optical head;
        servo control of the feed mechanism for the optical head,
        servo control of the disc rotating mechanism,
        processing of signals read out from the optical head to provide data,
        correction of errors in the data,
        processing of inputs from the operating keys, and
        control of the bus line.

4. The method according to claim 1, wherein,
    the method additionally comprises the step of providing a connector connectable to an external interface; and
    the main routine causes the single central processing unit to perform the steps of:
    determining when the connector is connected to the an external interface, and
    upon determining that the external interface is connected to the connector, resetting the single central processing unit.

* * * * *